US008369294B2

(12) United States Patent
Inada

(10) Patent No.: US 8,369,294 B2
(45) Date of Patent: Feb. 5, 2013

(54) IP TELEPHONE TERMINAL AND COMPUTER READABLE STORAGE MEDIUM

(75) Inventor: Hajime Inada, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1133 days.

(21) Appl. No.: 12/201,478

(22) Filed: Aug. 29, 2008

(65) Prior Publication Data

US 2009/0059902 A1 Mar. 5, 2009

(30) Foreign Application Priority Data

Aug. 30, 2007 (JP) ............................ P2007-224429
Apr. 7, 2008 (JP) ............................ P2008-098915

(51) Int. Cl.
H04W 4/00 (2009.01)
(52) U.S. Cl. ....................................... 370/338; 370/352
(58) Field of Classification Search .................. 370/352, 370/338
See application file for complete search history.

(56) References Cited

U.S. PATENT DOCUMENTS

| 6,151,389 A * | 11/2000 | Lai et al. ....................... 379/156 |
| 6,154,639 A * | 11/2000 | Kanazumi et al. ............... 455/74 |
| 7,058,171 B2 | 6/2006 | Ouchi et al. |
| 2004/0028198 A1 | 2/2004 | Ouchi et al. |
| 2004/0028220 A1 | 2/2004 | Ouchi et al. |
| 2004/0209656 A1 * | 10/2004 | Kitami et al. .............. 455/569.1 |

FOREIGN PATENT DOCUMENTS

| JP | H07-321898 A | 12/1995 |
| JP | 2003-169107 | 6/2003 |
| JP | 2004-080149 | 3/2004 |
| JP | 2004-320457 A | 11/2004 |
| JP | 2005-130339 A | 5/2005 |
| JP | 2005-175722 | 6/2005 |
| JP | U 3125407 | 8/2006 |

OTHER PUBLICATIONS

Japan Patent Office, Office Action for Japanese Patent Application No. 2008-098915, mailed Jun. 28, 2011.

* cited by examiner

Primary Examiner — Gary Mui
(74) Attorney, Agent, or Firm — Baker Botts L.L.P.

(57) ABSTRACT

An IP telephone terminal and a method for controlling IP telephone terminal capable of performing IP telephone communication upon receiving information from a conversation application through a user interface provided with a microphone and a loud speaker when a conversation is to be performed with the microphone and the laud speaker. The IP telephone terminal is connected to an internet. The terminal has a mouse and a keyboard operable as an operation input device, and a microphone and a loud speaker operable as an audio input device. A first selecting unit selects the operation input device of an interface device, and a second selecting unit selects the audio input device of the interface device. A third selecting unit selects one of the interface devices. A first control part controls the first selecting unit so that the first selecting unit selects the operation input device of the interface device selected by the third selecting unit. A second control part controls the second selecting unit so that the second selecting unit selects the audio input device of the interface device selected by the third selecting unit.

10 Claims, 9 Drawing Sheets

| INTERFACE DEVICE | INTERFACE DEVICE 2a | INTERFACE DEVICE 2b |
|---|---|---|
| DEVICE NAME | MFC-1000 | MFC-2000 |
| DEVICE DRIVER NAME | MFC-1000 HID Driver | MFC-2000 HID Driver |
| AUDIO DRIVER NAME | MFC-1000 Audio Driver | MFC-2000 Audio Driver |

55

| SKYPE NAME | DEVICE NAME |
|---|---|
| AAAAAA | MFC-1000 |
| BBBBBB | MFC-2000 |
| CCCCCC | MFC-1000 |
| ... | ... |
| INITIALLY SET DEVICE | MFC-1000 |

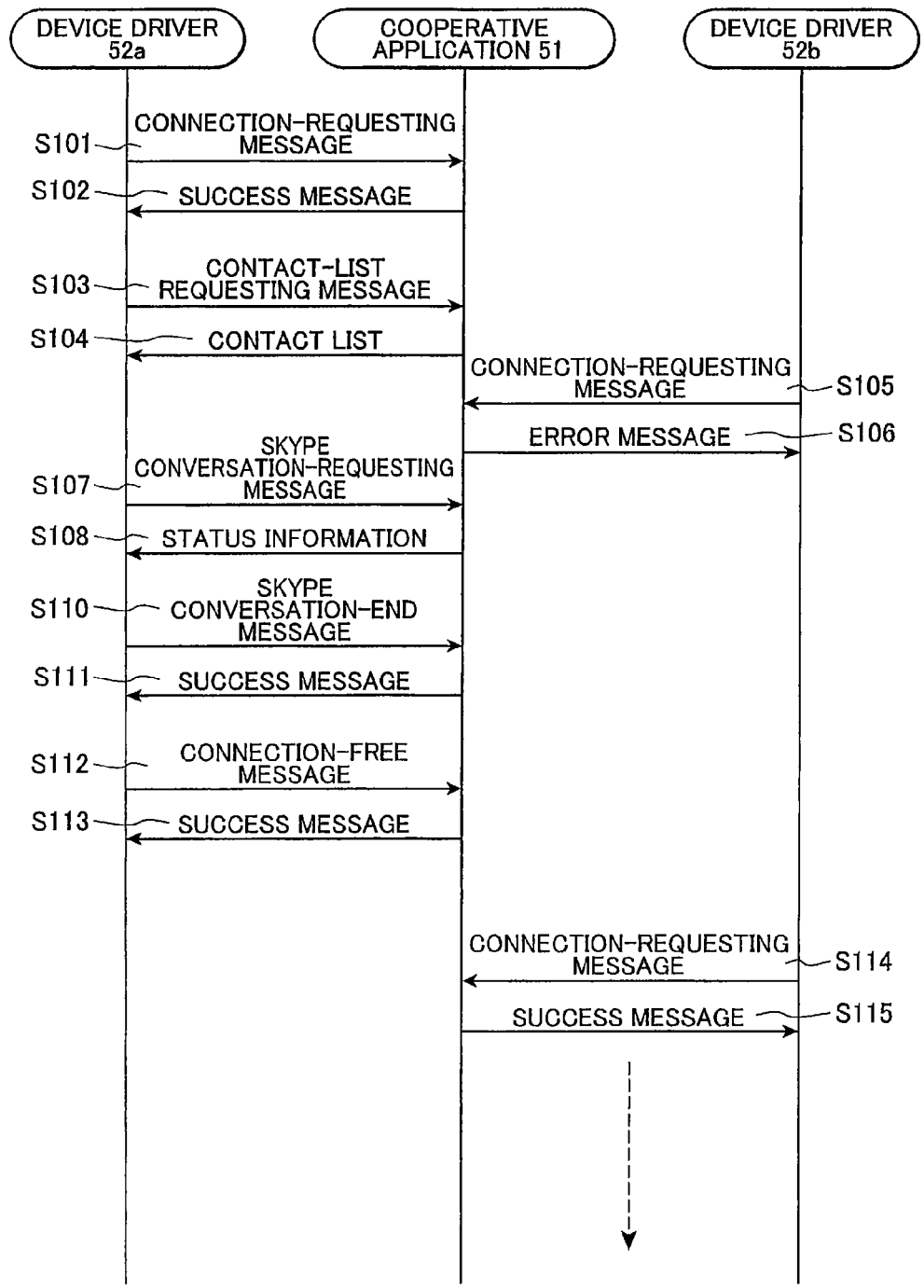

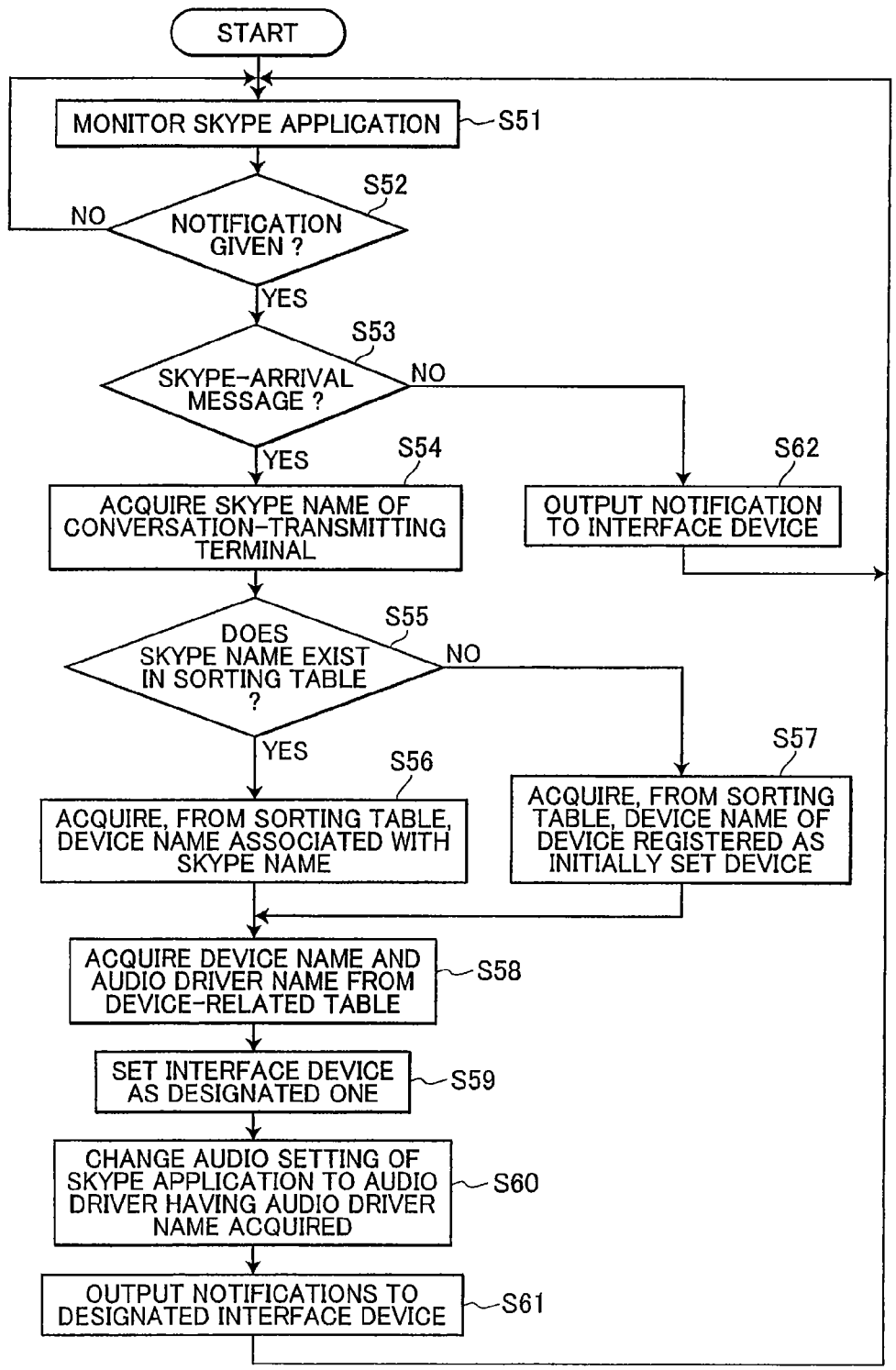

IP TELEPHONE TERMINAL AND COMPUTER READABLE STORAGE MEDIUM

CROSS REFERENCE TO RELATED APPLICATIONS

This application claims priority from Japanese Patent Application Nos. 2007-224429 filed Aug. 30, 2007 and 2008-098915 filed Apr. 7, 2008. The entire content of each of these priority applications is incorporated herein by reference.

TECHNICAL FIELD

The present invention relates to an IP telephone terminal and a computer readable storage medium.

BACKGROUND

Any user can utilize an IP telephone system if he or she has installed, into a network terminal such as a personal computer or a telephone terminal, a conversation application, which is a software for transmitting, receiving calls and achieving telephone talks, provided by the IP telephone company. In the conversation application, there are registered user ID, display name and profile. Thus, the conversation application identifies the user by means of the user ID, display name and profile. An example of the IP telephone system is Skype (registered trademark).

Japanese Patent Application Publication No. 2003-169107 describes a system in which a personal computer, i.e., a network terminal capable of performing network communication, and a head-set, i.e., an interface device, are USB-connected and a conversation application is used to achieve IP telephone communication. The personal computer incorporates a switch that changes a signal outputting a call-arrival tone generating signal to the built-in speaker and a conversation signal to the head-set.

Japanese Patent Application Publication No. 2005-175722 discloses a system in which a personal computer, i.e., a network terminal capable of performing network communication, and a head-set, i.e., an interface device, are USB-connected. Any user who has a network terminal and uses a hand-set can have an IP telephone conversation with another user who has a device connected to a network, by using the conversation application installed in the network terminal.

The conversation application transmits and receives message data and audio data to and from the interface device. The message data is information that controls the interface device and achieves mail transmission and receipt. The audio data represents the content of conversation. In case that a plurality of interface devices are connected to the network terminal and that one of the interface devices has been designated, then both the message data and the audio data must be communicated between the conversation application and the designated interface device.

A configuration of a conventional IP telephone system is shown in FIG. 12. As shown in FIG. 12, the IP telephone system includes a network terminal 100 such as a personal computer, an interface device 102a such as a USB telephone or a USB facsimile, and an IP telephone terminal 103.

The network terminal 100 and the IP telephone terminal 103 are connected bi-directionally by way of a network 106. The network terminal 100 and the interface device 102a have one USB port respectively. The USB port of the terminal 100 and the USB port of the interface device 102a are connected, so that the network terminal 100 and the interface device 102a are connected to each other.

The interface device 102a has a speaker-microphone unit (not shown). The interface device 102a can input and output the sound. The interface device 102a can perform data communication with the network terminal 100 via the USB port.

The conversation application 150 and a cooperative application 151 will be operated in the network terminal 100. A device driver 152a and an audio driver 153a will be operated in association with the interface device 102a. The network terminal 100 has a speaker-microphone unit 154 that enables the network terminal 100 to input and output an audio data.

With the arrangement described above, the conventional IP telephone system can communicate with the IP telephone terminal 103 as described below. The conversation application 150 is the application software in order to enable the network terminal 100 and the interface device 102a to communicate with the IP telephone terminal 103 via the network 106. The conversation application 150 is, for example, Skype software sold by Skype Limited.

The conversation application 150 enables the user to select either the speaker-microphone unit 154 provided in the network terminal 100 or the speaker-microphone unit 154 provided in the interface device 102a for the purpose of communication with the IP telephone terminal 103. The conversation application 150 can exchange audio data AD with the speaker-microphone unit the user has selected, through the audio drivers 153a and 153b incorporated in the network terminal 100.

More specifically, the conversation application 150 outputs the audio data DA representing a call arrival from the IP telephone terminal 103 or the audio data AD representing a conversation speech transmitted from the IP telephone terminal 103 to the device driver 152a or 153b corresponding to the speaker the user has selected. Either the device driver 152a or the device driver 153b reproduces the audio data, which is supplied to the speaker. Herewith, the speaker generates the sound of the speech represented by the audio data. The conversational speech input to a microphone that the user has selected is converted to the audio data AD by means of the audio drivers 153a or 153b corresponding to the microphone. This audio data AD is input to the conversation application 150. Thus, the conversation application 150 transmits the audio data AD to the IP telephone terminal 103.

In the conventional IP telephone system described above, the speaker the user has selected outputs the sound of speech coming from the IP telephone terminal 103, and the user can be input conversational speeches to the IP telephone terminal 103 from the microphone the user has selected.

The conversation application 150 has the function of informing the user of a call arrival and acquiring the inputs from the user through the user interface such as the display and keyboard of the network terminal 100. Therefore, the user can receive the notification from the conversation application 150 during the conversation through the speaker-microphone unit of the network terminal 100 and can operate the conversation application 150.

The conversation application 150 is so described configured, enabling the user converse through the speaker-microphone unit of the network terminal 100. The interface device 102a is used as a speaker-microphone unit only, not as anything else.

The cooperative application 151 links the conversation application 150 and the interface device 102a to each other, and serves the interface device 102a as the user interface. Hence, the cooperative application 151 has the function of informing the call arrival from the conversation application 150 to the display provided in interface device 102a, and has the function of transmitting any user input by keys provided in interface device 102a to the conversation application 150.

The cooperative application 151 uses an application program interface (API), exchanging various messages with the conversation application 150, and exchanging information data DD, which contains various messages, with the interface device 102a through the device driver 152a. The various messages can therefore be exchanged between the conversation application 150 and the interface device 102a.

Using the cooperative application 151, when the user uses the speaker-microphone unit of the interface device 102a, the user can receive notification from the conversation application 150 through the user interface of the interface device 102a and can operate the conversation application 150.

However, the conventional IP telephone system has following problems. Assume that the user, who usually uses the speaker-microphone unit of the network terminal 100 to converse through the IP telephone system, may use the interface device 102a (e.g., the extension of a USB main-extension phone, located far from the network terminal 100). In this case, the user input is transmitted from the interface device 102a to the conversation application 150. The conversation application 150 can therefore start communicating with the IP telephone terminal 103. However, the conversational speech that the conversation application 150 has received from the IP telephone terminal 103 is reproduced by the speaker provided in the network terminal 100. Thus, the user, who is using the interface device 102a, cannot perform conversation.

That is, the device (network terminal 100 or interface device 102a) having the speaker-microphone unit set by the conversation application 150 is not always corresponding to the device having the user interface actually used to achieve conversation. Here arises a problem.

The system disclosed in Japanese Patent Application Publication No. 2003-169107 has a switch as illustrated in FIGS. 1 and 2 of the publication. The user may operate the switch to supply the call-arrival tone generating signal received via a network, either to the speaker incorporated in the network terminal or to the speaker of the head set connected to the network terminal. However, the publication does not disclose a configuration in which the head set is used as a user interface that gives gives the user the notification coming from the conversation application or receives inputs the user has made.

In other words, Japanese Patent Application Publication No. 2003-169107 does not disclose that audio data may be switched between the interface devices connected to the network terminals provided in the system. Consequently, the problem pointed out above arises. That is, the user using one of the interface devices cannot converse with anyone else who uses another interface device that is receiving audio data.

In the system disclosed in Japanese Patent Application Publication No. 2003-169107, the network terminal must be customized to be an IP telephone terminal to have a switch dedicated for receiving audio data. If provided with this switch, however, the customized network terminal can no longer be used as ordinary network terminal, having but lower versatility.

Japanese Patent Application Publication No. 2005-175722 does not disclose the technique of first selecting one of interface devices and then exchanging message data and audio data between the conversation application and the interface device selected. The audio data may not be transmitted to or received between the conversation application and the interface device, though the message data can be transmitted and received therebetween. In this case, when a call request comes from an external IP telephone terminal connected to the network, the call-notifying message can indeed be transmitted to the interface device, but the audio data representing the call-arrival tone cannot be transmitted. This is a problem. Further, even if the user uses the interface device, responding to the call request, the audio data representing the conversation cannot be exchanged between the user and the external IP telephone terminal. This is another problem. Conversely, the user may request for conversation with another user of the external IP telephone terminal through the conversation application, by using the interface device. In this case, the audio data representing the conversation cannot be exchanged between the interface device and the external IP telephone terminal. This is still another problem.

Japanese Patent Application Publication No. 2005-175722 discloses a configuration in which a USB cable connects the PC to the main-extension phone, enabling the user to use the main-extension phone, thereby to converse with another user of an IP telephone terminal connected to the network. However, the publication dose not disclose any arrangement for solving the problem that the device having a speaker-microphone unit set in the conversation application is not always compatible with the device having the user interface actually used to accomplish conversation.

SUMMARY

The present invention has been made in order to solve the problems discribed above. An object of this invention is to provide an IP telephone terminal, which render a device (network terminal or interface device) having a speaker-microphone unit set in the conversation application, compatible with the device having the speaker-microphone unit that a user may use to converse with the first-mentioned device, and which enables the user to perform IP telephone communication by utilizing the speaker-microphone unit upon receiving a notification from a conversation application through the user interface of a device having the speaker-microphone unit. Another object of the present invention is to provide a network terminal, which enable a user to select a specific interface device and which can transmit and receive message data and audio data to and between the network terminal and the interface device selected.

In order to attain the above aspect, the present invention provides an IP telephone terminal includes a communication unit, a connecting unit, a first selecting unit, a second selecting unit, an operation-input receiving unit, an audio-input receiving unit, an IP telephone function control unit, a third selecting unit, and a selection control unit. The communication unit performs IP telephone communication with any other IP telephone terminal via an internet. The connecting unit connects a plurality of interface devices each including an audio input device and an operation input device. The first selecting unit selects the operation input device. The second selecting unit selects the audio input device. The operation-input receiving unit receives an operation input from the operation input device. The audio-input receiving unit receives an audio input from the audio input device. The IP telephone function control unit includes a first transmitting part and a second transmitting part. The first transmitting part transmits a conversation request to the other IP telephone terminal through the IP telephone communication in accordance with an operation input from the operation input device selected by the first selecting unit. The second transmitting part transmits audio data input from the audio input device selected by the second selecting unit to the other IP telephone terminal through the IP telephone communication, thereby controlling the IP telephone function of performing conversation with the other IP telephone terminal through the IP telephone communication. The third selecting unit selects one of the interface devices. The selection control unit includes a first control part and a second control part. The first control part controls the first selecting unit to allow the first selecting unit to select the operation input device of the interface device selected by the third selecting unit. The second control part controls the second selecting unit to allow the second selecting unit to select the audio input device of the interface device selected by the third selecting unit.

According to another aspect, the present invention provides an IP telephone terminal includes a communication unit, a connecting unit, a first selecting unit, a fourth selecting unit, an operation-input receiving unit, an audio-output control unit, an IP telephone function control unit, a fifth selecting unit, and a selection control unit. The communication unit performs IP telephone communication with any other IP telephone terminal via an internet. The connecting unit connects a plurality of interface devices each including an audio output device and an operation input device. The first selecting unit selects the operation input device. The fourth selecting unit selects the audio output device. The operation-input receiving unit receives an operation input from the operation input device. The audio-output control unit permits the audio output device to output an audio data. The IP telephone function control unit includes a send-back part and an output part. The send-back part sends back a conversation permission to the other IP telephone terminal which has transmitted a conversation request through the IP telephone communication, in accordance with an operation input from the operation input device selected by the first selecting unit. The output part permits the audio-output control unit to control the audio output device so that the audio output device selected by the fourth selecting unit outputs the audio data transmitted from the other IP telephone terminal through the IP telephone communication, thereby controlling an IP telephone function of conversing with the other IP telephone terminal through the IP telephone communication. The fifth selecting unit selects one of the interface devices. The selection control unit includes a first control part and a second control part. The first control part controls the first selecting unit to allow the first selecting unit to select the operation input device of the interface device selected by the fifth selecting unit. The second control part controls the fourth selecting part to allow the fourth selecting unit to select the audio output device of the interface device selected by the fifth selecting unit.

According to still another aspect, the present invention provides a computer readable storage medium storing a computer-executable program for controlling the computer operable as an IP telephone terminal. The IP telephone terminal includes a communication unit and a connecting unit. The communication unit performs IP telephone communication with any other IP telephone terminal via an internet. The connecting unit connects a plurality of interface devices each including an audio input device and an operation input device. The program for controlling the computer operable as an IP telephone terminal includes instructions for first selecting the operation input device, instructions for second selecting the audio input device, instructions for receiving an operation input from the operation input device, instructions for receiving an audio input from the audio input device, instructions for first transmitting a conversation request to the other IP telephone terminal through the IP telephone communication in accordance with an operation input from the operation input device selected by the first selection, instruction for second transmitting audio data input from the audio input device selected by the second selection to the other IP telephone terminal through the IP telephone communication, thereby controlling the IP telephone function of performing conversation with the other IP telephone terminal through the IP telephone communication, instructions for third selecting one of the interface devices, instructions for controlling the first selection so as to select the operation input device of the interface device selected by the third selection, and instructions for controlling the second selection so as to select the audio input device of the interface device selected by the third selection.

According to still another aspect, the present invention provides a computer readable storage medium storing a computer-executable program for controlling the computer operable as an IP telephone terminal. The IP telephone terminal includes a communication unit and a connecting unit. The communication unit performs IP telephone communication with any other IP telephone terminal via an internet. The connecting unit connects a plurality of interface devices each including an audio output device and an operation input device. The program for controlling the computer operable as an IP telephone terminal includes instructions for first selecting the operation input device, instructions for fourth selecting the audio output device, instructions for receiving an operation input from the operation input device, instructions for permitting the audio output device to output an audio data, instructions for sending-back a conversation permission to the other IP telephone terminal which has transmitted a conversation request through the IP telephone communication, in accordance with an operation input from the operation input device selected by the first selection, instructions for controlling the audio output device so that the audio output device selected by the fourth selection outputs the audio data transmitted from the other IP telephone terminal through the IP telephone communication, thereby controlling an IP telephone function of conversing with the other IP telephone terminal through the IP telephone communication, instructions for fifth selecting one of the interface devices, instructions for controlling the first selection to allow the first selection to select the operation input device of the interface device selected by the fifth selection, and instructions for controlling the fourth selection to allow the fourth selection to select the audio output device of the interface device selected by the fifth selection.

According to still another aspect, the present invention provides a computer readable storage medium storing a computer-executable IP telephone terminal application program for controlling the computer operable as an IP telephone terminal. The IP telephone terminal includes an internet-connecting unit, a connecting unit, and an IP telephone application. The internet-connecting unit connects to an internet. The connecting unit connects a plurality of interface devices each including an audio input device and an operation input device. The IP telephone application includes a first selecting unit, a second selecting unit, an operation-input receiving unit, an audio-input receiving unit, and an IP telephone function control unit. The first selecting unit selects the operation input device. The second selecting unit selects the audio input device. The operation-input receiving unit receives an operation input from the operation input device. The audio-input receiving unit receives an audio input from the audio input device. The IP telephone function control unit includes a first transmitting part and a second transmitting part. The first transmitting part transmits a conversation request to the other IP telephone terminal through the IP telephone communication in accordance with an operation input from the operation input device selected by the first selecting unit. The second transmitting part transmits audio data input from the audio input device selected by the second selecting unit to the other IP telephone terminal through the IP telephone communication, thereby controlling the IP telephone function of performing conversation with the other IP telephone terminal through the IP telephone communication. The IP telephone terminal application program includes instructions for third selecting one of the interface devices, instructions for controlling the first selecting unit so as to select the operation input device of the interface device selected by the third selection, and instructions for controlling the second selecting unit so as to select the audio input device of the interface device selected by the third selection.

According to still another aspect, the present invention provides an IP telephone terminal. The IP telephone terminal includes an internet-connecting unit, a connecting unit, an IP telephone application, a third selecting unit, and a selection control unit. The internet-connecting unit connects to the internet. The connecting unit connects a plurality of interface devices each including an audio input device and an operation input device. The IP telephone application includes a first selecting unit, a second selecting unit, an operation-input receiving unit, an audio-input receiving unit, and an IP telephone function control unit. The first selecting unit selects the operation input device. The second selecting unit selects the audio input device. The operation-input receiving unit receives an operation input from the operation input device. The audio-input receiving unit receives an audio input from the audio input device. The IP telephone function control unit includes a first transmitting part and a second transmitting part. The first transmitting part transmits a conversation request to the other IP telephone terminal through the IP telephone communication in accordance with an operation input from the operation input device selected by the first selecting unit. The second transmitting part transmits audio data input from the audio input device selected by the second selecting unit to the other IP telephone terminal through the IP telephone communication, thereby controlling the IP telephone function of performing conversation with the other IP telephone terminal through the IP telephone communication. The third selecting unit selects one of the interface devices. The selection control unit includes a first control part and a second control part. The first control part controls the first selecting unit to allow the first selecting unit to select the operation input device of the interface device selected by the third selecting unit. The second control part controls the second selecting unit to allow the second selecting unit to select the audio input device of the interface device selected by the third selecting unit.

BRIEF DESCRIPTION OF THE DRAWINGS

In the drawings:

FIG. 9 is a diagram illustrating a sequence of operation performed in the second embodiment;

FIG. 11 is a flowchart showing operation of a cooperative application according to a third embodiment of the present invention.

DETAILED DESCRIPTION

Figure 1:
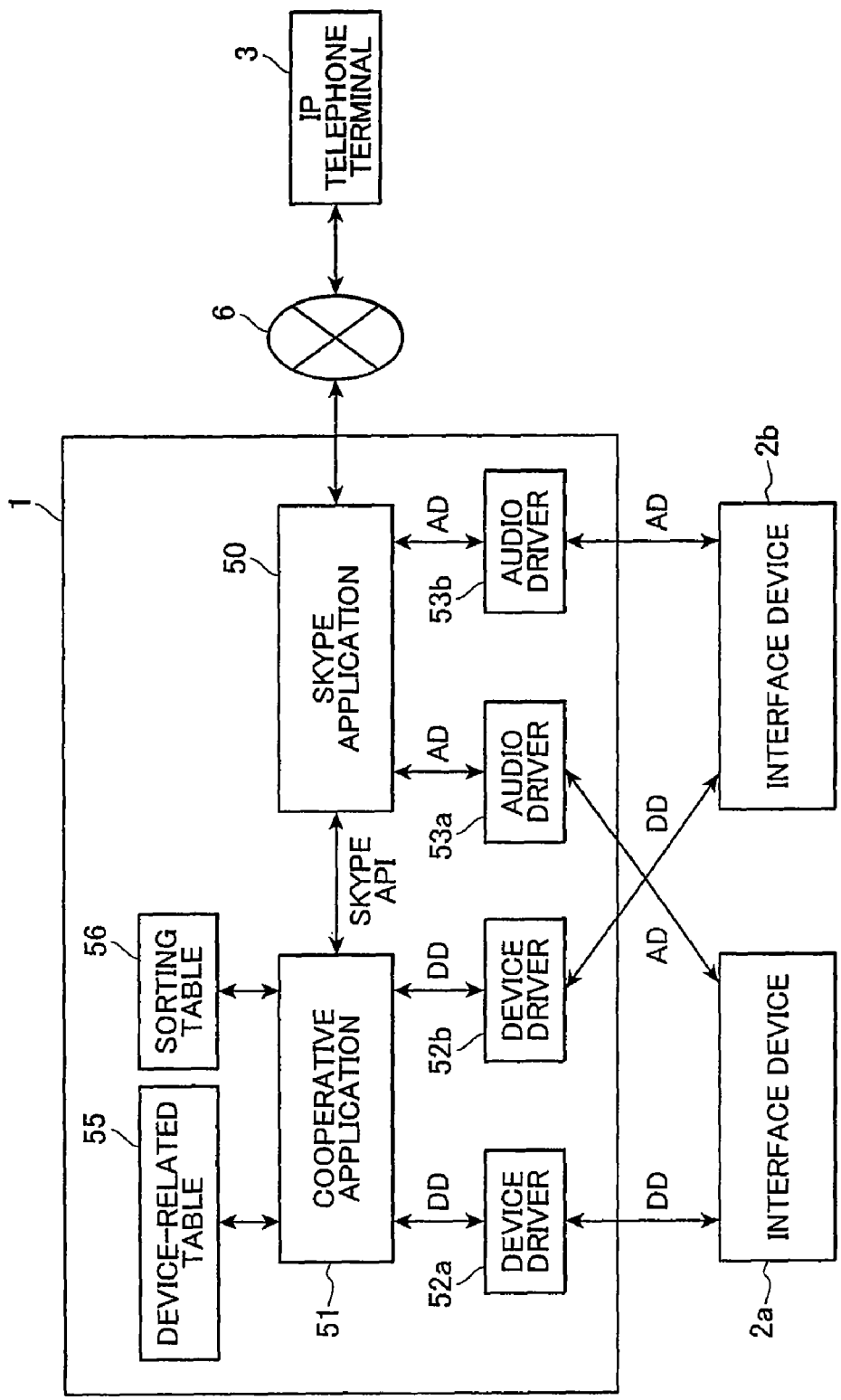
FIG. 1 is a diagram schematically showing an IP telephone system according to the present invention.

A network terminal according to a first embodiment of the present invention will be described with reference to FIGS. 1 to 6. The first embodiment is configured to set a destination of communication of the audio data AD of Skype application 50 a specific interface device designated by a user. FIG. 1 schematically shows a configuration of an IP telephone system. The IP telephone system shown in FIG. 1 includes a network terminal 1, interface devices 2a and 2b, and an IP telephone terminal 3. A personal computer is a typical example of the network terminal. Each of the interface devices 2a and 2b has a conversation device, which can serve as an IP telephone. The network terminal 1 and the IP telephone terminal 3 are connected by a network 6 and can therefore achieve two-way communication or bi-directional communication with each other. USB ports connect the interface devices 2a and 2b to the network terminal 1. In the network terminal 1, Skype application 50 and cooperative application 51 operate. A device driver 52a and an audio driver 53a operate in association with the interface device 2a. A device driver 52b and an audio driver 53b operate in association with the interface device 2b.

The Skype application 50 is application software that enables the network terminal 1 to achieve two-way communication with the IP telephone terminal 3 via the network 6. The Skype application 50 transmits and receives the audio data AD to and from the interface device 2a, through the audio driver 53a provided in the network terminal 1. More specifically, the audio data AD output from the Skype application 50 is input to the audio driver 53a. The audio driver 53a transmits the audio data AD to the interface device 2a. Thus, the interface device 2a reproduces the speech from the audio data AD. Similarly, the Skype application 50 transmits the audio data AD to the interface device 2b through the audio driver 53b.

The cooperative application 51 is application software that links the Skype application 50 to the interface devices 2a and 2b, causing the Skype application 50 to exchange various message data items with the interface devices 2a and 2b. The message data items include, for example, a contact-list request message and a Skype conversation request message. The contact-list request message requests the Skype application 50 to supply data that represent a list of candidate communication partners. The Skype conversation request message requests the Skype application 50 to initiate conversation.

The cooperative application 51 uses the Skype application program interface (API) in order to exchange various messages with the Skype application 50. Note that the Skype API provides compatible functions that can be used in both the cooperative application 51 and the Skype application 50. The Skype API enables the cooperative application 51 and the Skype application 50 to communicate with each other.

The cooperative application 51 exchanges information data DD, which contains various messages, with the interface device 2a through the device driver 52a. The various messages can thus be exchanged between the Skype application 50 and the interface device 2a. Similarly, the cooperative application 51 exchanges information data DD, which contains various messages, with the interface device 2b through the device driver 52b. That is, the cooperative application 51 can exchange various messages with both the interface device 2a and the interface device 2b.

Each of the interface devices 2a and 2b has an operation unit such as a microphone, a speaker, keys and buttons.

The IP telephone terminal connected to the network 6 is not limited to one IP telephone terminal 1. Rather, a plurality of IP telephone terminals can be connected to the network 6. The IP telephone system according to the present embodiment can communicate with each of the plurality of IP telephone terminals. Further, the IP telephone terminal is not limited to a terminal device such as a personal computer. Needless to say, the IP telephone terminal can be a fixed telephone or a mobile telephone. In the better case, a converter (e.g., Skype-in device) is connected between the fixed or mobile telephone and the network terminal, ensuring the data exchange between the telephone and the network terminal.

Figure 2:
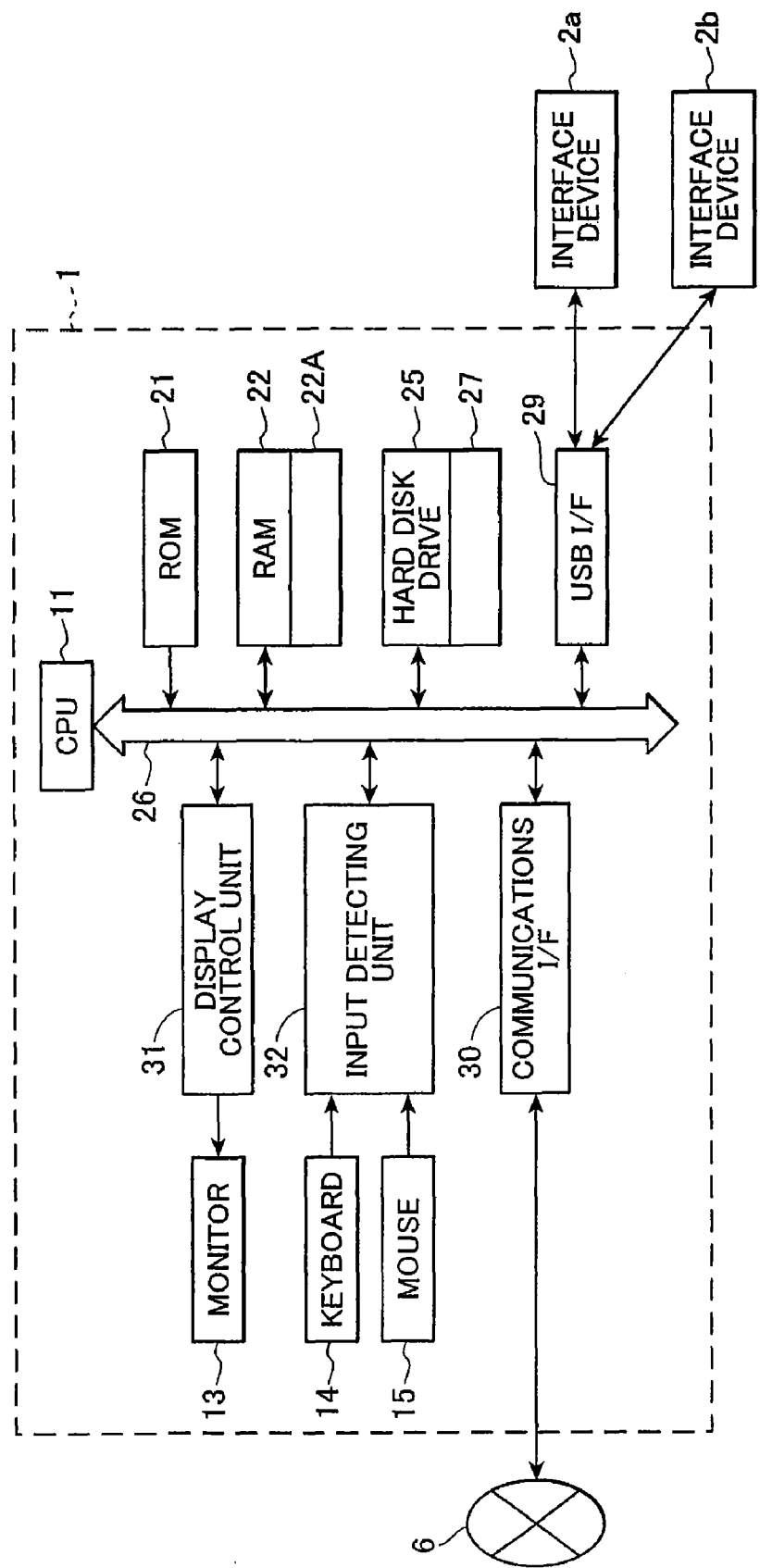
FIG. 2 is a diagram illustrating an electrical configuration of a network terminal.

An electrical configuration of the network terminal 1 will be described with reference to FIG. 2. The network terminal 1 includes a CPU 11 that controls components of the network terminal 1. Via a bus 26, a ROM 21, a RAM 22, and a hard disk drive 25 are connected to the CPU 11. The ROM 21 stores programs, such as BIOS, for the execution of the CPU 11. The RAM 22 temporarily stores the results computed by the CPU 11. The hard disk drive 25 is a data storage device. The RAM 22 has various storage areas including a work area 22A. The hard disk drive 25 has a storage area 27, in which the Skype application 50, cooperative application 51, and device-related table 55 are stored.

To the bus 26, a USB I/F 29, a communications I/F 30, a display control unit 31, and an input detecting unit 32 are connected. The USB I/F 29 performs USB connection to the interface devices 2a and 2b. The communications I/F 30 is adapted for communication with the network 6. The display control unit 31 causes the monitor 13 to display an operation menu to the user. The input detecting unit 32 is adapted for detecting data items the user has input by operating the keyboard 14 or mouse 15. The way the keyboard 14 and mouse 15 are connected to the input detecting unit 32 is not restrictive. The keyboard 14 and mouse 15 can be connected input detecting to the input detecting unit 32 by radio using infrared rays or by a short LAN cable.

The device-related table 55 will be described with reference to FIG. 3. The device-related table 55 is stored in the storage area 27 of the hard disc device 25. In the device-related table 55, the name "MFC-1000" of the interface device 2a, the name "MFC-1000 HID Driver" of the device driver 52a, and the name "MFC-1000 Audio Driver" of the audio driver 53a are registered in mutual association. Similarly, in the device-related table 55, the name "MFC-2000" of the interface device 2b, the name "MFC-2000 HID Driver" of the device driver 52b, and the name "MFC-2000 Audio Driver" of the audio driver 53b are registered in mutual association. The device names are identification data items that identify the interface devices 2a and 2b, respectively. The device driver names are identification data items that identify the device drivers 52a and 52b, respectively. The audio driver names are identification data items that identify the audio drivers 53a and 53b, respectively.

The storage medium that stores the device-related table 55 is not limited to the hard disk provided in the hard disk drive 25 that is incorporated in the network terminal 1. Instead, the storage medium can be a nonvolatile memory such as a hard disk connected to the network 6 or a volatile memory such as the RAM 22.

Linking operation of the cooperative application 51 operation will be described with reference to the flowchart of FIG. 4. First, the CPU 11 (FIG. 2) executes the Skype application 50 and the cooperative application 51, both stored in the storage area 27. Then, the Skype application 50 and the cooperative application 51 start operating in the network terminal 1 as shown in FIG. 1. The hard disc drive 25 already determines which one of the interface devices should be communicated. This is because the selected one of the interface device previously set in the Skype application is maintained in the hard disc drive 25. The CPU 11 in the network terminal 1 performs the processes described below.

In Step (hereinafter abbreviated S) 11, the cooperative application 51 monitors the Skype application 50. Then, the determination is made as to whether or not a notification using Skype API has been given from the Skype application 50 to the interface device 2a or 2b in S12. If no notification has been given (S12:no), the process goes to S14. If a notification has been given (S12:yes), the process goes to S13.

In S13, the cooperative application 51 receives the notification input from the Skype application 50 and converts the same to information data DD. The information data DD is output to the interface device 2a or 2b through a device driver. The notification input from the Skype application 50 contains the identification data identifying the interface device 2a or the interface device 2b, to which the notification should be sent. If the identification data identifies the interface device 2a, the notification input from the Skype application 50 is output to the device driver 52a. If the identification data identifies the interface device 2b, the notification input from the Skype application 50 is output to the device driver 52b. That is, the cooperative application 51 sorts various notifications coming from the Skype application 50 to the interface devices in S11 to S13.

In S14, the cooperative application 51 monitors the device drivers 52a and 52b. In S15, the CPU 11 determines whether the information data DD has been input from the device driver 52a or 52b. If no information data DD has been input from the device driver 52a or the device driver 52b (S15:no), the process returns to S11. Thus, the cooperative application 51 keeps monitoring the Skype application 50. If the information data DD has been input from the device driver 52a or the device driver 52b (S15:yes), the process goes to S16.

In S16, the cooperative application 51 issues the Skype API that meets the request described in the message contained in the information data DD to be input, to the Skype application 50. The process then returns to S11. The information data DD and the Skype API contain identification data identifying one of the interface device 2a and 2b that has output the message. The Skype application 50 can therefore determine which interface device, device 2a or device 2b, has output the message. That is, the cooperative application 51 performs an operation of transferring the message output from one of the interface device 2a and 2b to the Skype application 50 in S14 to S16. Thus, the cooperative application 51 can transfer various messages between the Skype application 50 and one of the interface devices 2a and 2b.

The Skype application 50 and cooperative application 51 perform a process of switching the designated interface device from one to another. The switching process will be explained with reference to the flowchart of FIG. 5. Switching from the interface device 2a to the interface device 2b as a the designated interface device will be described. Note that the "designated interface device" is either the device 2a or the device 2b that has been designated as the device to which the information data DD and audio data AD should be transmitted. The device driver associated with the designated interface device is the designated device driver. The designated device driver transfers the information data DD between the cooperative application 51 and the designated interface device.

Upon starting the process of switching the designated interface device, in S21, the cooperative application 51 reads the device-related table 55 (FIG. 3) stored in the hard disk drive 25. Then, the cooperative application 51 causes the display control unit 31 to control the monitor 13, so that the monitor 13 displays a device-switching user interface 57 shown in FIG. 6. That is, the display control unit 31 controls the monitor 13 so as to display device names (an example of device information) indicative of the interface devices 2a and 2b.

The device-switching user interface 57 shows the device name "MFC-1000," i.e., data identifying the interface device 2a, and the device name "MFC-2000," i.e., data identifying the interface device 2b for selection of one of the interface devices. The user operates the keyboard 14 or mouse 15 for selecting one of the interface devices 2a or 2b and the designated interface device. Assume that the user selects the device name "MFC-2000," so that the interface device 2b is selected as the designated one. That is, the interface device selected, upon operation of the keyboard 14 or mouse 15 from a plurality of interface devices displayed at the device name will become a designated interface device.

The device driver 52b, which is associated with the designated interface device 2b, will be determined to be the designated device driver 52b.

In S22, determination is made as to whether or not the designated interface device has been set. If the designated interface device has not been set (S22:NO), the process returns to S21. Thus, the monitor 13 displays again the device-switching user interface 57. If the designated interface device has been set (S22:YES), the process goes to S23.

In S23, the cooperative application 51 acquires the driver name "MFC-2000 HID Driver" which is the designated device driver 52b from the device-related table 55, and then over-writes the driver name in the work area 22A of the RAM 22. The device driver 52b is thus registered as designated device driver. Therefore, the cooperative application 51 can determine the interface-device driver that drives the designated interface device, causing the same to transmit and receive the message data, thus switching the destination of the message data to the interface device that has been designated. As a result, the interface device 2b (see FIG. 1) can be selected as designated interface device.

In S24, the cooperative application 51 acquires, from the device-related table 55, the audio driver name "MFC-2000 Audio Driver" which is the audio driver 53b that is associated with the designated interface device 2b. The interface device is set as an audio device into the Skype application 50 in accordance with the designated device name. The Skype application 50 can therefore handle the designated interface device 2b as audio device.

In S25, the cooperative application 51 issues the Skype API to the Skype application 50. The Skype API changes the audio setting of the Skype application 50 to the audio driver 53b designated by the audio driver name "MFC-2000 Audio Driver" that has been acquired. In accordance with the Skype API issued, the Skype application 50 over-writes the audio driver name "MFC-2000 Audio Driver" in the work area 22A of the RAM 22 and sets the audio driver 53b as destination of communication of the audio data AD. As a result, the interface device 2b is selected as audio input device. Therefore, the Skype application can set the audio driver that transmits the message data to the designated interface device, as the destination of the audio data, thus switching the destination of the audio data to the interface device that has been designated.

Figures 3, 4:
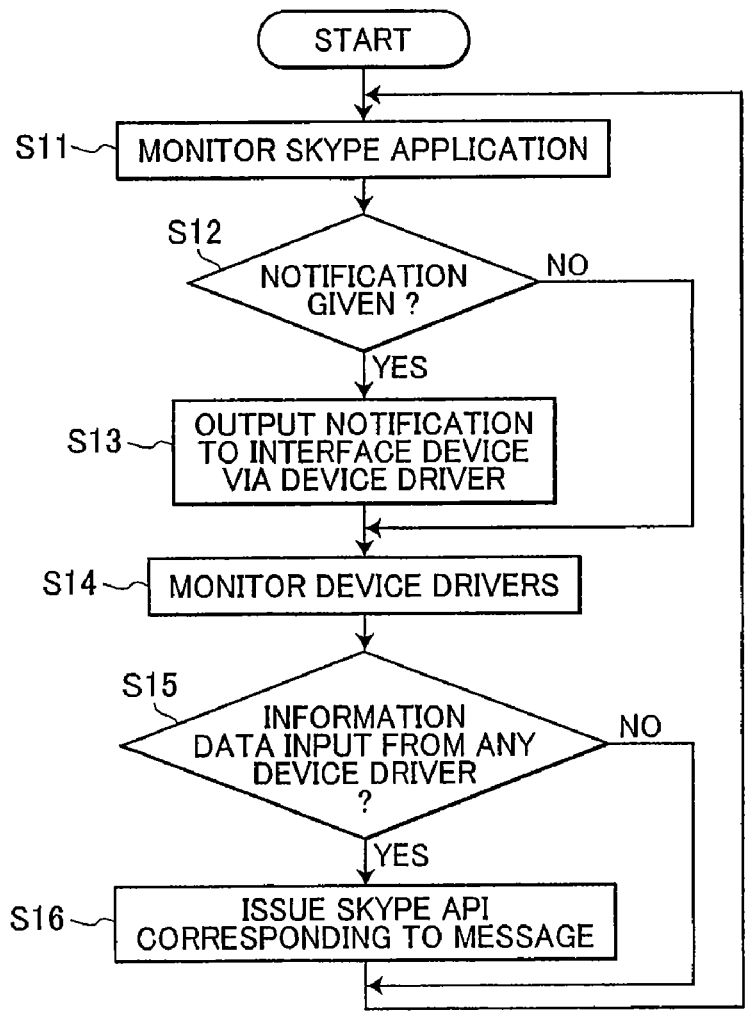
FIG. 3 is a diagram showing a device-related table 55.
FIG. 4 is a flowchart showing the operation of a cooperative application used in a first embodiment of the present invention.
Figure 5:
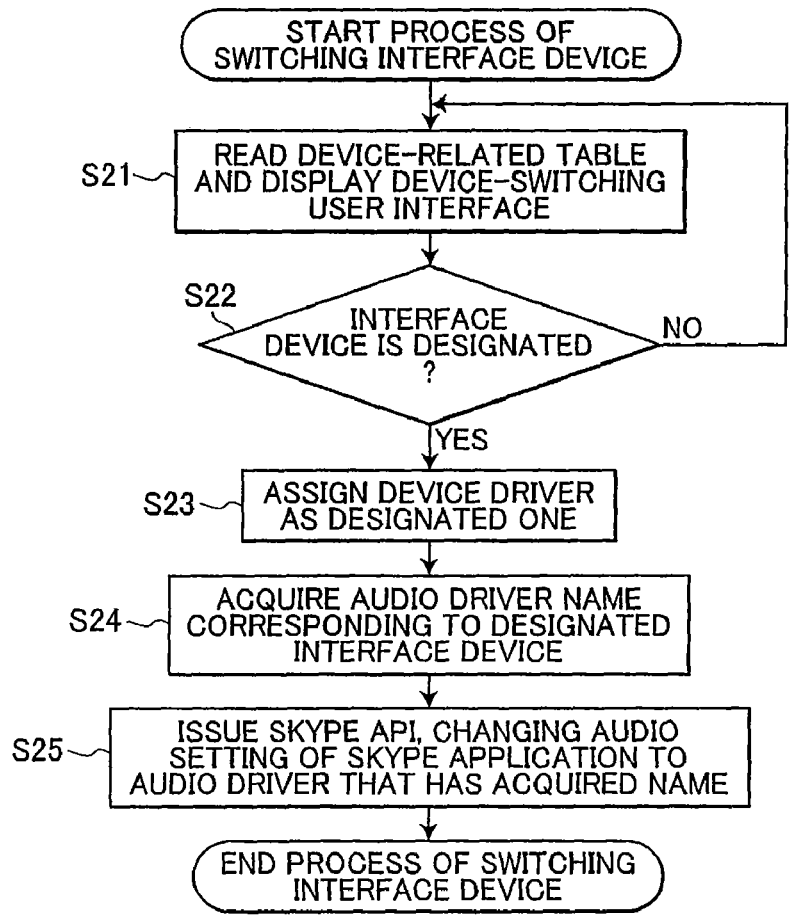
FIG. 5 is a flowchart showing a switching process for switching interface device to another interface device in the first embodiment.
Figure 6:
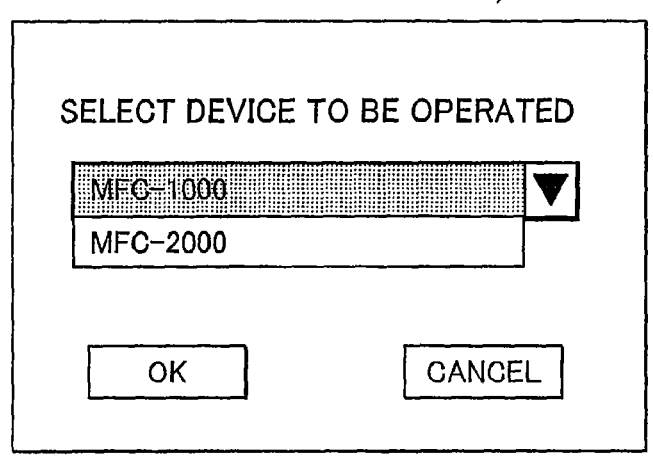
FIG. 6 is a diagram showing a device-switching user interface according to the first embodiment.

After the process of switching the designated interface device has been performed as shown in FIG. 5, the input from the designated interface device selected in S23 is received in order to perform the process shown in the flowchart of FIG. 4. If the information data DD has been input (S15:YES), the cooperative application 51 issues, to the Skype application 50, the Skype API corresponding to the request message contained in the input information data DD.

For example, the content of the message may be a Skype conversation request message requesting that the conversation be started. In this case, in accordance with the operation performed at the designated interface device, the Skype application 50 transmits, for example, a conversation request to another IP telephone terminal through IP telephone communication, and transmits to the other IP telephone terminal the audio data input from the designated interface device selected in S25 through IP telephone communication. The IP telephone function that achieves the conversation with the other IP telephone terminal through IP telephone communication is thus controlled.

That is, the conversation request is transmitted to the other IP telephone terminal through IP telephone communication, in accordance with the operation performed at the keyboard 14 and mouse 15 of the designated interface device. Thus, the audio data input at the speaker-microphone of the designated interface device can be transmitted to the other IP telephone terminal through IP telephone communication.

The content of the message may be a message permitting the conversation. In this case, the Skype application 50 sends back conversation permission to the other IP telephone terminal through IP telephone communication, in accordance with the operation performed at the designated interface device. Further, the Skype application 50 outputs the audio data transmitted from the other IP telephone terminal through IP telephone communication, to the designated interface device selected in the process of S25. The IP telephone function of performing conversation with the other IP telephone terminal through the IP telephone communication is thus controlled.

That is, the conversation permission is sent back to the other IP telephone terminal through IP telephone communication in accordance with the operation performed at the keyboard 14 or mouse 15 of the designated interface device, and the audio data transmitted from the other IP telephone terminal is output from the speaker-microphone of the designated interface device.

Thus, the information data DD is relayed between the designated interface device and the Skype application 50 through the cooperative application 51. Further, the CPU 11 performs direct exchange of audio data between the cooperative application 51 and the designated interface device. That is, various communications, such as conversation and mailing, can be achieved by means of the designated interface device. Moreover, if executing the process of S23, S24, and S25, the communication partner of the audio driver can be switched to the designated interface device. The designated interface device can then be utilized as an audio input/output device.

As has been described above, the cooperative application 51 according to the first embodiment can read the data source and data destination contained in the information data DD and various messages, thereby determining the data source and data destination. Hence, even if the designated interface device is switched to another interface device, the cooperative application 51 can exchange the information data DD and messages with the interface device that has been newly designated upon switching operation. Moreover, the cooperative application 51 can receive the message output from the Skype application 50 toward the designated interface device and can transfer this message to the designated interface device. Further, the cooperative application 51 can transfer only the information data DD output from the designated interface device to the Skype application 50 and can block the information data DD output from any other interface devices which have not been designated.

The audio data AD contains no information that identifies the source or destination of the audio data AD. This is because the audio data AD inherently undergoes one-to-one communication. Therefore, if the designated interface device is switched to another interface device, the Skype application 50 can hardly exchange the audio data AD with the interface device that has been newly designated.

In the first embodiment, however, the cooperative application 51 issues a Skype API to the Skype application 50 when the designated interface device is switched to another interface device, the Skype API being indicative of switching destination of the audio data AD to the newly designated interface device. The Skype API switches the destination of the audio data AD to the designated interface device. Thus, once the user has switched the designated interface device to any other interface device, the Skype application 50 can exchange the audio data AD with the interface device newly designated. The designated interface device can therefore be utilized as audio input/output device.

In the first embodiment, one of the device names from the device names displayed on the monitor 13, corresponding interface device can be designated as the designated interface device. The user can thus designate the interface device to be used in the IP telephone communication.

Figure 7:
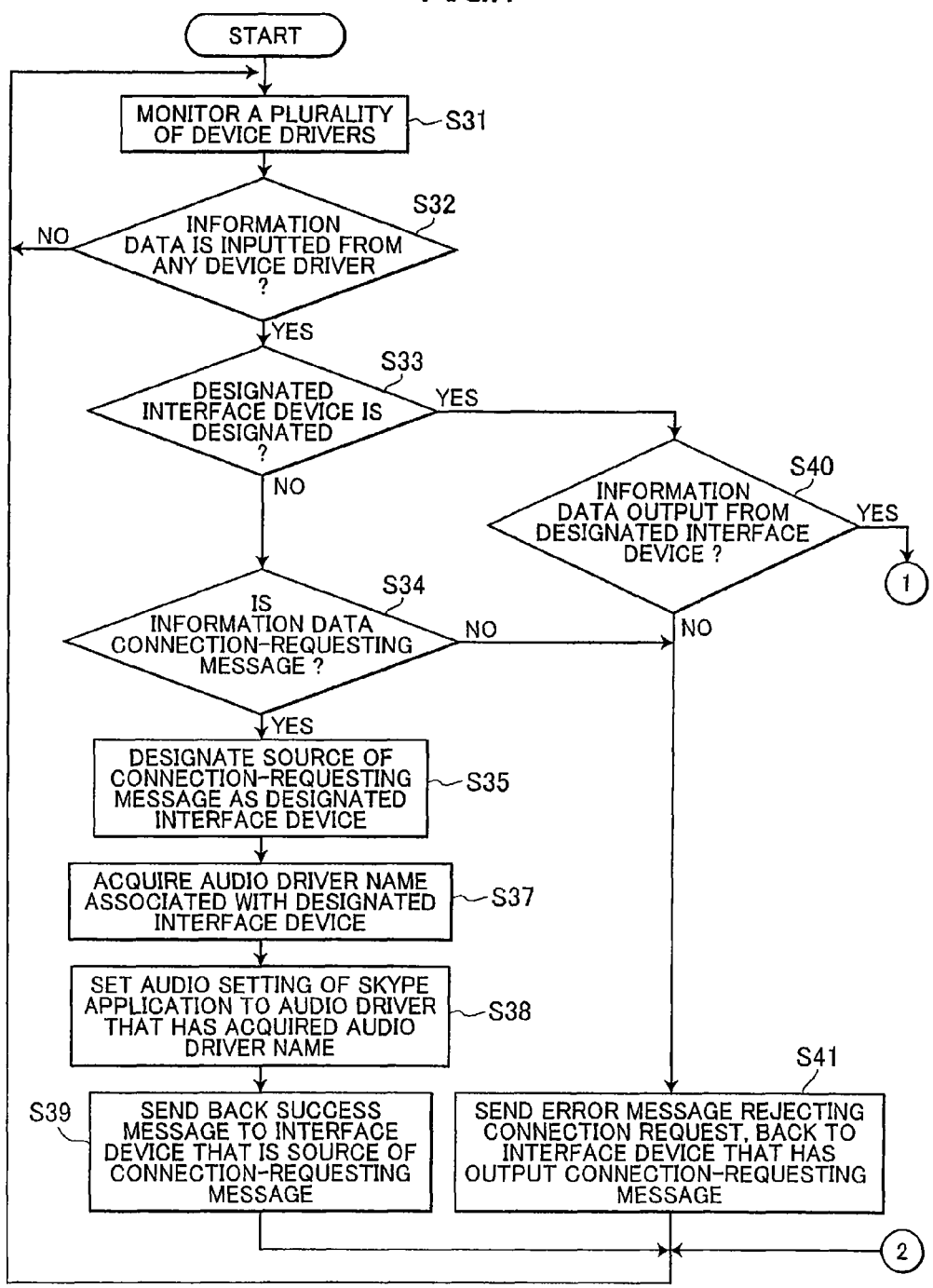
FIG. 7 is a first flowchart showing operation of cooperative application according to a second embodiment of the present invention.
Figures 8, 10:
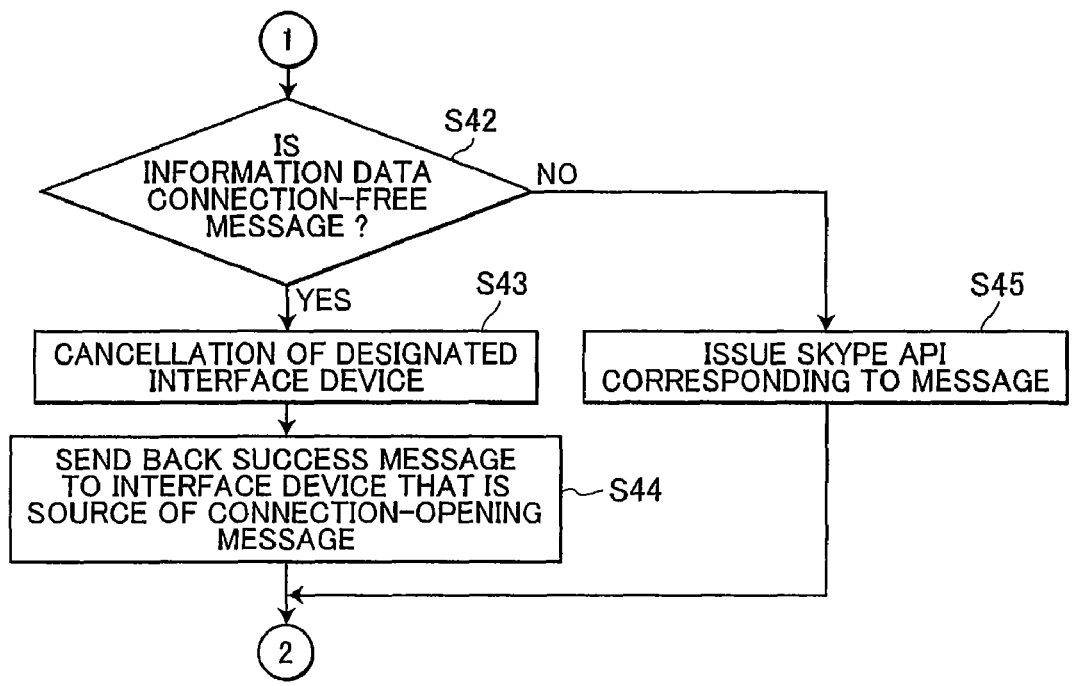
FIG. 8 is a second flowchart showing remaining operation of the cooperative application according to the second embodiment.
FIG. 10 is a diagram showing a sorting table in the third embodiment.
Figure 12:
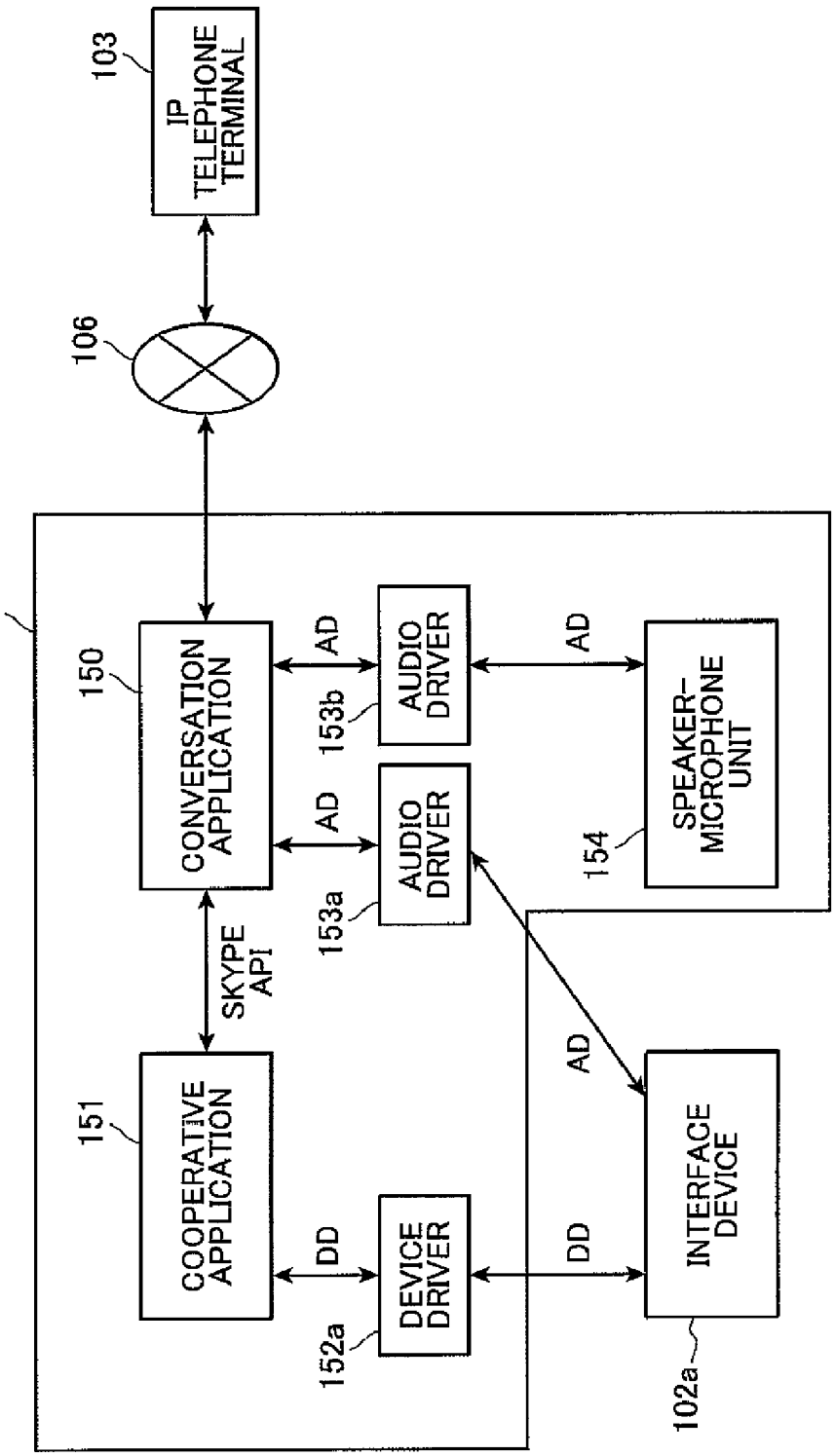
FIG. 12 is a diagram showing a conventional IP telephone system.

A second embodiment of this invention will be described with reference to FIGS. 7 to 9. The second embodiment is configured to set the interface device that issues a connection-requesting message as the destination of the audio data AD of the Skype application 50. The network terminal according to the second embodiment is identical in configuration to the network terminal 1 of the first embodiment. Therefore, the network terminal 1 will not be described in detail.

The operation of the cooperative application 51, shown in the sequence diagram of FIG. 9, will be described with reference to the flowcharts of FIGS. 7 and 8. In S31, the cooperative application 51 monitors the device drivers 52*a* and 52*b*. In S32, the CPU 11 determines whether or not the information data DD has been input from the device driver 52*a* or 52*b*. If no information data DD has been input (S32:NO), the process returns to S31, in which the cooperative application 51 monitors the input of the information data DD again.

Assume that a connection-requesting message output from the interface device 2*a* is input to the cooperative application 51 via the device driver 52*a* as in S101 shown in FIG. 9. In this case, the information data DD from the device driver 52*a* is retrieved in S32 (FIG. 7), so that the process goes to S33.

In S33, the CPU 11 determines whether or not an interface device has been designated. If any one of the interface devices has been already designated (S33:YES), the process goes to S40. If interface device has not been designated yet (S33: NO), the process goes to S34. In this embodiment, the process goes to S34 provided that no interface devices have been designated yet at the time of S101.

In S34, the CPU 11 determines whether or not the information data DD is a connection-requesting message. In this embodiment, the information data DD input from the device driver 52*a* at the time of S101 is a connection-requesting message. Therefore, the process goes to S35.

In S35, the cooperative application 51 determines that the interface device 2*a*, which is the source of the connection-requesting message, is the designated interface device. Then, the cooperative application 51 acquires from the device-related table 55 the driver name "MFC-1000 HID Driver" of the device driver 52*a* associated with the designated interface device 2*a*. The driver name acquired is stored in the work area 22A of the RAM 22. The device driver 52*a* is thereby registered as the designated device driver and the process goes to S37.

In S37, the cooperative application 51 acquires from the device-related table 55 the audio driver name "MFC-1000 Audio Driver" which is the audio driver 53*a* associated with the designated interface device 2*a*.

In S38, the cooperative application 51 issues the Skype API to the Skype application 50. The Skype API changes the audio setting of the Skype application 50 to the audio driver 53*a* corresponding to the audio driver name that has been acquired. In accordance with the Skype API issued, the Skype application 50 temporarily stores the audio driver name "MFC-1000 Audio Driver" of the audio driver 53*a* in the work area 22A of the RAM 22 and sets the audio driver 53*a* as destination of communication of the audio data AD. The Skype application 50 can therefore exchange the audio data AD with the interface device 2*a* via the audio driver 53*a*.

Thus, the interface device 2*a* can be selected as audio device. In S39, the cooperative application 51 sends back a connection-success message via the device driver 52*a* to the interface device 2*a* that is the source of the connection-requesting message (S102 in FIG. 9). The interface device switching process is thus terminated. Then, the process returns to S31.

In S103 shown in FIG. 9, a contact-list requesting message output from the interface device 2*a* is input to the cooperative application 51 via the device driver 52*a*. In this case, determination is made that there is an input of the information data DD from the device driver 52*a*(S32:YES). The process goes to S33. In S33, the designated interface device has been already determined to be the device 2*a* (S33:YES). The process therefore goes to S40. In S40, whether or not the information data DD has been output from the interface device 2*a*, which is the designated interface device, is determined. In S103, the interface device 2*a*, which is the designated interface device, outputs the information data DD, i.e., contact-list requesting message (S40:YES). The process therefore goes to S42 (FIG. 8).

In S42, the CPU 11 determines whether or not the information data DD is a connection-free message. Since the information data DD is a contract-list requesting message in S103 (S42:NO), the process goes to S45. In S45, the cooperative application 51 issues to the Skype application 50 the Skype API that corresponds to the contact-list requesting message. In accordance with the Skype API issued, the Skype application 50 outputs a contact list to the device driver 52*a* via the cooperative application 51 (S104 in FIG. 9).

Thus, the cooperative application 51 transfers to the Skype application 50 the message input from the designated interface device 2*a*.

Assume that a contact-list requesting message output from the interface device 2b is input, in S105 shown in FIG. 9, to the cooperative application 51 via the device driver 52b. In this case, determination is made that there is an input of the information data DD (S32:YES), so that the process goes to S33. In S33, since the designated interface device 2a has been already determined designated (S33:YES). The process goes to S40. In S40, the CPU 11 determines whether or not the information data DD has been output from the designated interface device. In S105, the interface device 2b, which is not the designated interface device, outputs the information data DD (S40:NO). The process therefore goes to S41. In S41, an error message rejecting the connection request is sent back to the interface device 2b that has output the connection-requesting message via the device driver 52b (S106 in FIG. 9).

Thus, as long as the interface device 2a remains designated, the cooperative application 51 blocks any message input from an interface device other than the designated interface device in order to avoid transfer of the message to the Skype application 50.

In S107 shown in FIG. 9, a Skype conversation-requesting message output from the interface device 2a is input to the cooperative application 51 via the device driver 52a. In this case, the process proceeds to S45 (FIG. 8) through S32, S33, S40 and S42 as described above. In S45, the cooperative application 51 issues Skype API to the Skype application 50 corresponding to the Skype conversation-requesting message. In accordance with the Skype API thus issued, the Skype application 50 outputs status information to the device driver 52a via the cooperative application 51 (S108 in FIG. 9). Thus a Skype conversation can be started.

Then, in S110 shown in FIG. 9, the Skype conversation-end message output from the interface device 2a is input to the cooperative application 51 via the device driver 52a. The process goes to S45 through S32, S33, S40 and S42 as described above. In S45, the cooperative application 51 issues, to the Skype application 50, the Skype API corresponding to the Skype conversation-end message. In accordance with the Skype API thus issued, the Skype application 50 terminates the Skype conversation. Then, the cooperative application 51 sends back a success message to the interface device 2a that is the source of the Skype conversation-end message (S111 in FIG. 9).

Assume that the connection-free message output from the interface device 2a is input to the cooperative application 51 via the device driver 52a in S112 shown in FIG. 9. In this case, the process proceeds to S42 (FIG. 8) through S32, S33 and S40 as described above. In S42 (FIG. 8), the information data DD is found to be the connection-free message (S42:YES). The process therefore goes to S43. In S43, the driver name of the device driver 52a already stored in the work area 22A of the RAM 22 is erased there from. The interface device 2a will become undesignated interface device. The interface device 2a is thereby set as not designated. Then, in S44, the cooperative application 51 sends back an opening-success message via the device driver 52a to the interface device 2a that is the source of the connection-free message (S113 in FIG. 9).

Assume that, in S114 shown in FIG. 9, the connection-requesting message output from the interface device 2b is input to the cooperative application 51 via the device driver 52b. In this case, no interface devices have been designated, unlike the situation in S105. Therefore, the interface device 2b will become a designated interface device, and the connection-requesting message input from the interface device 2b is not blocked by the cooperative application 51. As described above, the process goes to S39 through S32, S33, S34, S35, S36, S37 and S38. Therefore, the audio setting of the Skype application 50 is changed to the audio driver 53b. Then, in S39, the cooperative application 51 sends back a connection-success message via the device driver 52b to the interface device 2b that is the source of the connection-requesting message.

As described above the cooperative application 51 according to the second embodiment designates the interface device that has output a connection-requesting message, while interface devices has not been designated yet. When the interface device that has output a connection-requesting message is designated, the cooperative application 51 issues, to the Skype application 50, a Skype API designating the interface device as the destination of the audio data AD.

The cooperative application 51 can therefore set the interface device operated by the user to perform IP telephone communication, as the destination of the audio data AD of the Skype application 50. This enables the user to reliably converse with any other IP telephone terminal 3, by using the interface device he or she operates.

That is, the user can utilize the interface device used to input a request for conversation with the other IP telephone terminal, in order to input and output audio data.

Upon receiving a connection-free message, the cooperative application 51 cancels designation of the interface device. The cooperative application 51 can therefore respond to the connection-requesting message coming from any interface device, as long as the audio driver remains open while the interface devices are not used for communication. While the cooperative application 51 remains standby mode, any interface device can be used to converse with the other IP telephone terminal and can reliably generate a call-arrival tone at the desired interface device.

A third embodiment of the present invention will be described with reference to FIGS. 10 and 11. The third embodiment is configured to set the interface device associated with the other IP telephone terminal 3 that has requested communication, as the destination of the audio data AD of the Skype application 50. The network terminal 1 is identical in configuration to the counterpart of the first embodiment. Therefore, the network terminal 1 will not be described in detail.

A sorting table 56 will be described with reference to FIG. 10. The device-related table 55 is stored in the storage area 27. In the sorting table 56, the Skype names and device names of the interface devices are registered in one-to-one correspondence. The Skype name distinguishes one IP telephone terminal from the other IP telephone terminal 3 outside the network. In the sorting table 56 shown in FIG. 10, the device name "MFC-1000" is associated with the Skype name "AAAAAA," the device name "MFC-2000" is associated with the Skype name "BBBBBB," and the device name "MFC-1000" is associated with the Skype name "CCCCCC." Further, "MFC-1000" is associated with a Skype name that is not registered in the sorting table 56, and is therefore registered as an initially set device.

Operation of the cooperative application 51 will be described with reference to the flowchart of FIG. 11.

Assume that a Skype conversation is sent from the IP telephone terminal 3 having the Skype name "BBBBBB." In S51, the cooperative application 51 monitors the Skype application 50. In S52, the cooperative application 51 monitors whether or not a notification using Skype API has been given from the Skype application 50. If no notification has been given (S52:NO), the process returns to S51 to continue monitoring. If a notification has been given (S52:YES), the process goes to S53.

In S53, the CPU determines whether or not the notification is a Skype-arrival message from the IP telephone terminal 3. If the notification is not a Skype-arrival message (S53:NO), the process goes to S62, where the cooperative application 51 converts the notification from the Skype application 50 into information data DD. The information data DD is output to the device driver 52a or 52b. If the notification is a Skype-arrival message (S53:YES), the process goes to S54.

In S54, the cooperative application 51 acquires from the Skype application 50 a Skype name "BBBBBB" of IP telephone terminal which is the originator.

In S55, the cooperative application 51 reads the sorting table 56 (FIG. 10) stored in the hard disk drive 25 and determines whether or not acquired the Skype name exists in the sorting table 56. If the Skype name exists (S55:YES), the process goes to S56. In S56, the cooperative application 51 acquires, from the sorting table 56, the device name of the interface device associated with the Skype name. If the Skype name does not exist in sorting table 56 (S55:NO), the process goes to S57. In S57, the cooperative application 51 acquires, from the sorting table 56, the device name of the interface device registered as initially set device. In this instance, the cooperative application 51 acquires the device name "MFC-2000" shown in FIG. 10, because the device name "MFC-2000" is associated with the Skype name "BBBBBB."

In S58, the cooperative application 51 acquires, from the device-related table 55 (FIG. 3), the device driver name and audio driver name those associated with the acquired device name. In this instance, the device drive name "MFC-2000 HID Driver" and the audio driver name "MFC-2000 Audio Driver" are acquired from the device-related table 55.

In S59, the cooperative application 51 stores the device name "MFC-2000," thus acquired, in the work area 22A of the RAM 22. The interface device 2b is thus set as designated interface device.

In S60, the cooperative application 51 issues a Skype API to the Skype application 50 for changing the audio setting of the Skype application 50 to the audio driver 53a that has the audio driver name acquired, i.e., "MFC-2000 Audio Driver."

In S61, the cooperative application 51 outputs the various notifications coming from the Skype application 50, to the designated interface device 2b.

In the process shown in FIG. 11, if the Skype name coming from the other IP telephone terminal that has transmitted the conversation request exists in the sorting table 56, the interface device, which is associated with the Skype name of the other IP telephone terminal, can be selected on the basis of the information related to this interface device and stored in the sorting table 56. Therefore, the interface device in accordance with the other IP-telephone terminal 3 can be selected.

While receiving a communication call-arrival request coming from the other IP telephone terminal 3, the Skype application 50 keeps inputting the audio data AD representing the call-arrival tone to the audio driver 53b. The audio driver 53b therefore generates data representing the call-arrival tone, which is then supplied to the designated interface device 2b. Thus, the designated interface device 2b therefore generates the call-arrival tone.

Hearing the call-arrival tone generated by the designated interface device, the user can recognize the communications call-arrival request (an example of the conversation request) coming from the other IP telephone terminal 3.

As long as the user keeps talking, while receiving the conversation data from the IP telephone terminal 3, the audio data AD representing the conversation speech is input to the audio driver 53b. The audio driver 53b reproduces the speech data and the speech data is transmitted to the designated interface device 2b. Utilizing the designated interface device 2b, the user can talk with the person at the IP telephone terminal 3.

As described above, upon receiving a communications call-arrival request according to the third embodiment from the other IP telephone terminal 3 connected to the network 6, the cooperative application 51 sets, as a designated interface device, the interface device associated with the other IP telephone terminal 3. IN accordance with the setting of the designated interface device, the cooperative application 51 issues a Skype API to the Skype application 50 for setting the designated interface device as a destination of the audio data AD.

The cooperative application 51 can therefore switch the destination of the audio data AD of the Skype application 50 to the interface device associated with the IP telephone terminal 3 that is the source of the conversation request. Hence, the user can talk with the person at the IP telephone terminal 3, using the interface device already designated for communication with the IP telephone terminal 3.

The Skype application 50 according to the third embodiment causes the designated interface device to generate a call-arrival tone, upon receiving a communications call-arrival request from the IP telephone terminal 3. To achieve communication between the IP telephone terminal 3 and the designated interface device, the Skype application 50 causes the terminal 3 and the designated interface device to communicate bi-directionally with each other exchanging audio data. Therefore, the designated interface device can reliably generate a call-arrival tone and enable the user to talk with the person at the IP telephone terminal 3.

While the invention has been described in detail with reference to the first to third embodiments thereof, it would be apparent to those skilled in the art that various changes and modifications may be made therein without departing from the spirit of the invention. In the specific embodiments, the cooperative application 51 can exchange various messages with one of the two interface devices 2a and 2b. The configuration need not be limited to this arrangement. For example, the cooperative application 51 can exchange messages with the interface device 2a only. In the better case, the cooperative application 51 selects the interface device 2a as a designated interface device, if the user designates the interface device 2a, if the interface device 2a transmits a connection-requesting message, or if the interface device 2a is compatible with the other IP telephone terminal 3 that has requested for communication. The cooperative application 51 sets the interface device 2a as destination of the audio data AD of the Skype application 50. Consequently, the interface device 2a can therefore be designated and utilized as an audio input/output device, even if other interface devices that cannot exchange various messages with the cooperative application 51 are connected to the network terminal 1. Needless to say, the present invention can be applied to a system in which three or more interface devices can exchange various messages with the cooperative application 51.

In the embodiments described above, the Skype application 50 that communicates with the IP telephone terminal 3 is one program, and the cooperative application 51 that links with the Skype application 50 is another program. Such an IP telephone terminal can achieve the advantages of the present invention.

In the second embodiment, while the interface device remains unused to perform communication, the audio driver is opened and therefore a standby phase can be provided capable of responding to a connection-requesting message coming from any interface device. This invention is not limited to this configuration. For example, the cooperative application 51 can switch the destination of the audio data AD, from the designated interface device to a built-in device such as the speaker-microphone unit of the network terminal 1, in response to a connection-free message output from the Skype application 50 or the designated interface device. In this case, the device incorporated in the network terminal 1 can be the destination of the audio data AD as long as the interface device remains unused to perform communication. The user can use the built-in device of the network terminal as initially set device.

Instead, a program can be installed in an IP telephone terminal. The program includes a module executing the process the same as the process executed by the cooperative application 51, and the module is incorporated in the communication application that controls IP telephone communication.

What is claimed is:

1. An IP telephone terminal comprising:
a processor;
a communication unit configured to perform an IP telephone communication with another IP telephone terminal via an internet;
an interface device connecting unit configured to connect a plurality of interface devices to the IP telephone terminal, each interface device of the plurality of interface devices including an audio receiving device configured to receive audio data and a device-side operation receiving device configured to receive an operation input; and
a storing device configured to store:
an IP telephone application;
audio identification data that identifies the audio receiving device provided in each of the plurality of interface devices, the audio identification data including usage audio identification data that identifies a particular audio receiving device to be used by the IP telephone application; and
operation identification data that identifies the device-side operation receiving device provided in each of the plurality of interface devices, the operation identification data including usage operation identification data, and the operation identification data being associated with the audio identification data,
wherein the IP telephone application comprises:
a reception unit configured to receive a starting command from a particular device-side operation receiving device corresponding to a particular interface device of the plurality of interface devices, the IP telephone application configured to set the particular interface device as an interface device to be used for the IP telephone communication after receiving the starting command from the particular device-side operation receiving device corresponding to the particular interface device;
a communication control unit configured to control the IP telephone terminal to start the IP telephone communication with the other IP telephone terminal through the internet when the reception unit receives the starting command for starting the IP telephone communication; and
an audio communication control unit configured to transmit to the other IP telephone terminal, via the IP telephone communication, audio data received by the particular audio receiving device identified by the usage audio identification data stored in the storing device after the communication control unit controls the IP telephone terminal to start the IP telephone communication, wherein the IP telephone terminal further comprises:
an interface device selecting unit configured to select the particular interface device from the plurality of interface devices as a selected interface device;
an audio identification data acquiring unit configured to acquire from the storing device the audio identification data identifying the particular audio receiving device, which is provided in the selected interface device;
an audio identification data storing unit configured to store in the storing device the audio identification data acquired by the audio identification data acquiring unit as the usage audio identification data
an operation identification data acquiring unit configured to acquire from the storing device the operation identification data identifying the particular device-side operation receiving device, which is provided in the selected interface device;
an operation identification data storing unit configured to store in the storing device the operation identification data acquired by the operation identification data acquiring unit as the usage operation identification data; and
an IP telephone function control unit comprising:
a first transmitting part configured to transmit a conversation request to the other IP telephone terminal through the communication unit in accordance with an operation input from the particular device-side operation receiving device, which is identified by the usage operation identification data, and
a second transmitting part that transmits audio data received by the particular audio receiving device, which is identified by the usage audio identification data stored in the storing device, through the communication unit, thereby controlling an IP telephone function of performing conversation with the other IP telephone terminal through the IP telephone communication.

2. An IP telephone terminal comprising:
a processor;
a communication unit configured to perform IP telephone communication with another IP telephone terminal via an internet;
an interface device connecting unit configured to connect a plurality of interface devices to the IP telephone terminal, each interface device of the plurality of interface devices including an audio receiving device configured to receive audio data and a device-side operation receiving device configured to receive an operation input; and
a storing device configured to store:
an IP telephone application;
audio identification data that identifies the audio receiving device provided in each of the plurality of interface devices, the audio identification data including usage audio identification data that identifies a particular audio receiving device to be used by the IP telephone application; and
operation identification data that identifies the device-side operation receiving device provided in each of the plurality of interface devices, the operation identification data including usage operation identification data, and the operation identification data being associated with the audio identification data,
wherein the IP telephone application comprises:
a reception unit configured to receive a starting command from a particular device-side operation receiving device corresponding to a particular interface device of the plurality of interface devices, the IP telephone application configured to set the particular interface device as an interface device to be used for the IP telephone communication after receiving the starting command from the particular device-side operation receiving device corresponding to the particular interface device;
a communication control unit configured to control the IP telephone terminal to start the IP telephone communication with the other IP telephone terminal through the internet when the reception unit receives the starting command for starting the IP telephone communication; and
an audio communication control unit configured to transmit to the other IP telephone terminal, via the IP telephone communication, audio data received by the particular audio receiving device identified by the usage audio identification data stored in the storing device after the communication control unit controls the IP telephone terminal to start the IP telephone communication,
wherein the IP telephone terminal further comprises:
an interface device selecting unit configured to select the particular interface device from the plurality of interface devices as a selected interface device;
an audio identification data acquiring unit configured to acquire from the storing device the audio identification data identifying the particular audio receiving device, which is provided in the selected interface device;
an audio identification data storing unit configured to store in the storing device the audio identification data acquired by the audio identification data acquiring unit as the usage audio identification data;
an operation identification data acquiring unit configured to acquire from the storing device the operation identification data identifying the particular device-side operation receiving device, which is provided in the selected interface device;
an operation identification data storing unit configured to store in the storing device the operation identification data acquired by the operation identification data acquiring unit as the usage operation identification data; and
an IP telephone function control unit comprising:
a send-back part configured to send back a conversation permission to the other IP telephone terminal which has transmitted a conversation request through the communication unit, in accordance with an operation input from the particular device-side operation receiving device, which is identified by the usage operation identification data; and
an output part configured to control the particular audio receiving device so that the particular audio receiving device, which is identified by the usage audio identification data, outputs the audio data transmitted from the other IP telephone terminal through the communication unit, thereby controlling an IP telephone function of conversing with the other IP telephone terminal through the IP telephone communication.

3. A non-transitory computer readable storage medium storing a computer-executable IP telephone terminal application program for controlling a computer operable as an IP telephone terminal, the IP telephone terminal including a processor, a communication unit configured to perform IP telephone communication with another IP telephone terminal via an internet, an interface device connecting unit configured to connect a plurality of interface devices each including an audio receiving device configured to receive audio data and a device-side operation receiving device configured to receive an operation input, and a storing device configured to store: an IP telephone application; audio identification data identifying the audio receiving device provided in each of the plurality of interface devices and including usage audio identification data identifying a particular audio receiving device to be used by the IP telephone application; and operation identification data identifying the device-side operation receiving device provided in each of the plurality of interface devices and including usage operation identification data, the operation identification data being associated with the audio identification data; the IP telephone application comprising instructions that instruct the processor to function as:
a reception unit configured to receive a starting command from a particular device-side operation receiving device corresponding to a particular interface device of the plurality of interface devices, the IP telephone application configured to instruct the processor to set the particular interface device as an interface device to be used for the IP telephone communication after receiving the starting command from the particular device-side operation receiving device corresponding to the particular interface device;
a communication control unit configured to control the IP telephone terminal to start the IP telephone communication with the other IP telephone terminal through the internet when the reception unit receives the starting command for starting the IP telephone communication;
an audio communication control unit configured to transmit to the other IP telephone terminal, via the IP telephone communication, audio data received by the particular audio receiving device identified by the usage audio identification data stored in the storing device after the communication control unit controls the IP telephone terminal to start the IP telephone communication,
an interface device selecting unit configured to select the particular interface device from the plurality of interface devices as a selected interface device;
an audio identification data acquiring unit configured to acquire from the storing device the audio identification data identifying the particular audio receiving device, which is provided in the selected interface device;
an audio identification data storing unit configured to store in the storing device the audio identification data acquired by the audio identification data acquiring unit as the usage audio identification data;
an operation identification data acquiring unit configured to acquire from the storing device the operation identification data identifying the particular device-side operation receiving device, which is provided in the selected interface device;
an operation identification data storing unit configured to store in the storing device the operation identification data acquired by the operation identification data acquiring unit as the usage operation identification data and instructions for first selecting the operation input device;
a first transmitting part configured to transmit a conversation request to the other IP telephone terminal through the communication unit in accordance with an operation input from the particular device-side operation receiving device, which is identified by the usage operation identification data;
a second transmitting part that transmits audio data received by the particular audio receiving device identified by the usage audio identification data stored in the storing device through the communication unit, thereby controlling an IP telephone function of performing conversation with the other IP telephone terminal through the IP telephone communication.

4. A non-transitory computer readable storage medium storing a computer-executable IP telephone terminal application program for controlling a computer operable as an IP telephone terminal, the IP telephone terminal including a processor, a communication unit configured to perform IP telephone communication with another IP telephone terminal via an internet, an interface device connecting unit configured to connect a plurality of interface devices each including an audio receiving device configured to receive audio data and a device-side operation receiving device configured to receive an operation input, and a storing device configured to store: an IP telephone application; audio identification data identifying the audio receiving device provided in each of the plurality of interface devices and including usage audio identification data identifying a particular audio receiving device to be used by the IP telephone application; and operation identification data identifying the device-side operation receiving device provided in each of the plurality of interface devices and including usage operation identification data, the operation identification data being associated with the audio identification data; the IP telephone application comprising instructions that instruct the processor to function as:

a reception unit configured to receive a starting command from a particular device-side operation receiving device corresponding to a particular interface device of the plurality of interface devices, the IP telephone application configured to instruct the processor to set the particular interface device as an interface device to be used for the IP telephone communication after receiving the starting command from the particular device-side operation receiving device corresponding to the particular interface device;

a communication control unit configured to control the IP telephone terminal to start the IP telephone communication with the other IP telephone terminal through the internet when the reception unit receives the starting command for starting the IP telephone communication;

an audio communication control unit configured to transmit to the other IP telephone terminal, via the IP telephone communication, audio data received by the particular audio receiving device identified by the usage audio identification data stored in the storing device after the communication control unit controls the IP telephone terminal to start the IP telephone communication, an interface device selecting unit configured to select the particular interface device from the plurality of interface devices as a selected interface device;

an audio identification data acquiring unit configured to acquire from the storing device the audio identification data identifying the particular audio receiving device, which is provided in the selected interface device;

an audio identification data storing unit configured to store in the storing device the audio identification data acquired by the audio identification data acquiring unit as the usage audio identification data;

an operation identification data acquiring unit configured to acquire from the storing device the operation identification data identifying the particular device-side operation receiving device, which is provided in the selected interface device;

an operation identification data storing unit configured to store in the storing device the operation identification data acquired by the operation identification data acquiring unit as the usage operation identification data instructions for first selecting the operation input device;

a sending-back part configured to send a conversation permission to the other IP telephone terminal which has transmitted a conversation request through the communication unit, in accordance with an operation input from the particular device-side operation receiving device, which is identified by the usage operation identification data; and an output part configured to control the particular audio receiving device so that the particular audio receiving device, which is identified by the usage audio identification data, outputs the audio data transmitted from the other IP telephone terminal through the communication unit, thereby controlling an IP telephone function of conversing with the other IP telephone terminal through the IP telephone communication.

5. A non-transitory computer readable storage medium storing a computer-executable IP telephone terminal application program for controlling a computer operable as an IP telephone terminal, the IP telephone terminal including a processor, an internet-connecting unit configured to connect to an internet, an interface device connecting unit configured to connect to a plurality of interface devices each including an audio receiving device configured to receive audio data and a device-side operation receiving device configured to receive an operation input, and a storing device configured to store: an IP telephone application; audio identification data identifying the audio receiving device provided in each of the plurality of interface devices and including usage audio identification data identifying a particular audio receiving device to be used by the IP telephone application; and operation identification data identifying the device-side operation receiving device provided in each of the plurality of interface devices and including usage operation identification data, the operation identification data being associated with the audio identification data, and the IP telephone application comprising instructions that instruct the processor to function as:

a reception unit configured to receive a starting command from a particular device-side operation receiving device corresponding to a particular interface device of the plurality of interface devices, the IP telephone application configured to instruct the processor to set the particular interface device as an interface device to be used for the IP telephone communication after receiving the starting command from the particular device-side operation receiving device corresponding to the particular interface device;

a communication control unit configured to control the IP telephone terminal to start the IP telephone communication with the other IP telephone terminal through the internet when the reception unit receives the starting command for starting the IP telephone communication;

an audio communication control unit configured to transmit to the other IP telephone terminal, via the IP telephone communication, audio data received by the particular audio receiving device identified by the usage audio identification data stored in the storing device after the communication control unit controls the IP telephone terminal to start the IP telephone communication, an interface device selecting unit configured to select the particular interface device from the plurality of interface devices as a selected interface device;

an audio identification data acquiring unit configured to acquire from the storing device the audio identification data identifying the particular audio receiving device, which is provided in the selected interface device;

an audio identification data storing unit configured to store in the storing device the audio identification data acquired by the audio identification data acquiring unit as the usage audio identification data;

an operation identification data acquiring unit configured to acquire from the storing device the operation identification data identifying the particular device-side operation receiving device, which is provided in the selected interface device;

an operation identification data storing unit configured to store in the storing device the operation identification data acquired by the operation identification data acquiring unit as the usage operation identification data; and a communication starting unit configured to transmit to the reception unit the starting command when the IP telephone terminal receives from the particular interface device through the interface device connecting unit the starting command based on an operation, which is inputted in the particular device-side operation receiving device identified by the usage operation identification data, for starting the IP telephone communication.

6. The non-transitory computer readable storage medium according to claim 5, wherein the IP telephone terminal further comprises a terminal-side operation receiving device configured to receive an operation input and a display output device, wherein the storing device is further configured to store a device identification data identifying each of the plurality of interface devices in addition to the audio identification data and the operation identification data, wherein the interface device selecting unit comprises:

a device identification data acquiring unit configured to acquire the device identification data from the storing device;

a display control unit configured to control the display output device to display a designation screen configured to receive the operation input indicating a selection of one of the plurality of interface devices based on the device identification data acquired by the device identification data acquiring unit;

a device designation unit configured to designate the interface device selected on the designation screen when the terminal-side operation receiving device receives the operation input indicating the selection of one of the plurality of interface devices after the display control unit controls the display output device to display the designation screen; and a designated device selecting unit configured to select the interface device designated by the device designation unit as the selected interface device.

7. The non-transitory computer readable storage medium according to claim 5, wherein the interface device selecting unit comprises a request device selecting unit configured to select as the selected interface device the interface device from which selecting request data requesting the selection of the interface device is transmitted when the IP telephone terminal receives via the interface device connecting unit the selecting request data based on an operation input, the operation input indicating a request for the selection of the interface device and being received by the device-side operation receiving device provided on one of the plurality of interface devices, wherein the audio identification data acquiring unit is configured to acquire the audio identification data when the request device selecting unit selects the interface device, wherein the audio identification data storing unit is configured to store the audio identification data in the storing device as the usage audio identification data when the audio identification data acquiring unit acquires the audio identification data, wherein the operation identification data acquiring unit is configured to acquire the operation identification data from the storing device when the request device selecting unit selects the interface device, wherein the operation identification data storing unit is configured to store the operation identification data in the storing device as the usage operation identification data when the operation identification data acquiring unit acquires the operation identification data from the storing device, wherein the communication starting unit is configured to transmit the starting command to the reception unit based on the selecting request data when the IP telephone terminal receives the selecting request data via the interface device connecting unit from the selected interface device, after the audio identification data storing unit stores the audio identification data in the storing device and the operation identification data storing unit stores the operation identification data in the storing device.

8. The non-transitory computer readable storage medium according to claim 5, wherein the storing device is further configured to store device identification data identifying each of the plurality of interface devices and terminal identification data identifying the other IP telephone terminal, the device identification data and the terminal identification data being associated with each other, wherein the interface device selecting unit comprises a device identification data acquiring unit configured to acquire the device identification data from the storing device, the device identification data acquiring unit being configured to acquire, when the IP telephone terminal receives the starting command and the terminal identification data identifying the other IP telephone terminal, the device identification data in association with the terminal identification data identifying the other IP telephone terminal receiving the starting command and the terminal identification data, wherein the interface device selecting unit is configured to select as the selected interface device the interface device identified by the device identification data acquired by the device identification data acquiring unit, wherein the audio identification data acquiring unit is configured to acquire the audio identification data when the identification device selecting unit selects the selected interface device, wherein the audio identification data storing unit is configured to store the audio identification data in the storing device as the usage audio identification data when the audio identification data acquiring unit acquires the audio identification data, wherein the operation identification data acquiring unit is configured to acquire the operation identification data from the storing device when the identification device selecting unit selects the selected interface device, wherein the operation identification data storing unit is configured to store the operation identification data in the storing device when the operation identification data acquiring unit acquires the operation identification data from the storing device.

9. The non-transitory computer readable storage medium according to claim 5, wherein the IP telephone application further comprises instructions that instruct the processor to function as an application program interface configured to store the audio identification data in the storing device,
  wherein audio identification data storing unit is configured to use the application program interface to store the audio identification data in the storing device.

10. An IP telephone terminal comprising:
  a processor;
  an internet-connecting unit configured to connect to the internet;
  an interface device connecting unit configured to connect a plurality of interface devices to the IP telephone terminal, each interface device of the plurality of interface devices including an audio receiving device configured to receive audio data and a device-side operation receiving device configured to receive an operation input; and
  a storing device configured to store:
    an IP telephone application;
    audio identification data that identifies the audio receiving device provided in each of the plurality of interface devices, the audio identification data including usage audio identification data that identifies a particular audio receiving device to be used by the IP telephone application; and
    operation identification data that identifies the device-side operation receiving device provided in each of the plurality of interface devices, the operation identification data including usage operation identification data, and the operation identification data being associated with the audio identification data,
  wherein the IP telephone application comprises:
    a reception unit configured to receive a starting command from a particular device-side operation receiving device corresponding to a particular interface device of the plurality of interface devices, the IP telephone application configured to set the particular interface device as an interface device to be used for the IP telephone communication after receiving the starting command from the particular device-side operation receiving device corresponding to the particular interface device;
    a communication control unit configured to control the IP telephone terminal to start the IP telephone communication with the other IP telephone terminal through the internet when the reception unit receives the starting command for starting the IP telephone communication; and
    an audio communication control unit configured to transmit to the other IP telephone terminal, via the IP telephone communication, audio data received by the particular audio receiving device identified by the usage audio identification data stored in the storing device after the communication control unit controls the IP telephone terminal to start the IP telephone communication,
  wherein the IP telephone terminal further comprises:
    an interface device selecting unit configured to select the particular interface device from the plurality of interface devices as a selected interface device;
    an audio identification data acquiring unit configured to acquire from the storing device the audio identification data identifying the particular audio receiving device, which is provided in the selected interface device;
    an audio identification data storing unit configured to store in the storing device the audio identification data acquired by the audio identification data acquiring unit as the usage audio identification data;
    an operation identification data acquiring unit configured to acquire from the storing device the operation identification data identifying the particular device-side operation receiving device, which is provided in the selected interface device;
    an operation identification data storing unit configured to store in the storing device the operation identification data acquired by the operation identification data acquiring unit as the usage operation identification data; and
  an IP telephone function control unit comprising:
    a first transmitting part configured to transmit a conversation request to the other IP telephone terminal through the IP telephone communication in accordance with an operation input from the particular device-side operation receiving device, which is identified by the usage operation identification data, and
    a second transmitting part that transmits audio data received by the particular audio receiving device identified by the usage audio identification data stored in the storing device through the IP telephone communication, thereby controlling an IP telephone function of performing conversation with the other IP telephone terminal through the IP telephone communication.

* * * * *